Aug. 9, 1932.  J. E. HUGHES  1,870,910
MEANS FOR RAISING AND LOWERING SHIELDS
OF TRACTOR SUPPORTED CULTIVATORS
Filed July 23, 1931   2 Sheets-Sheet 1
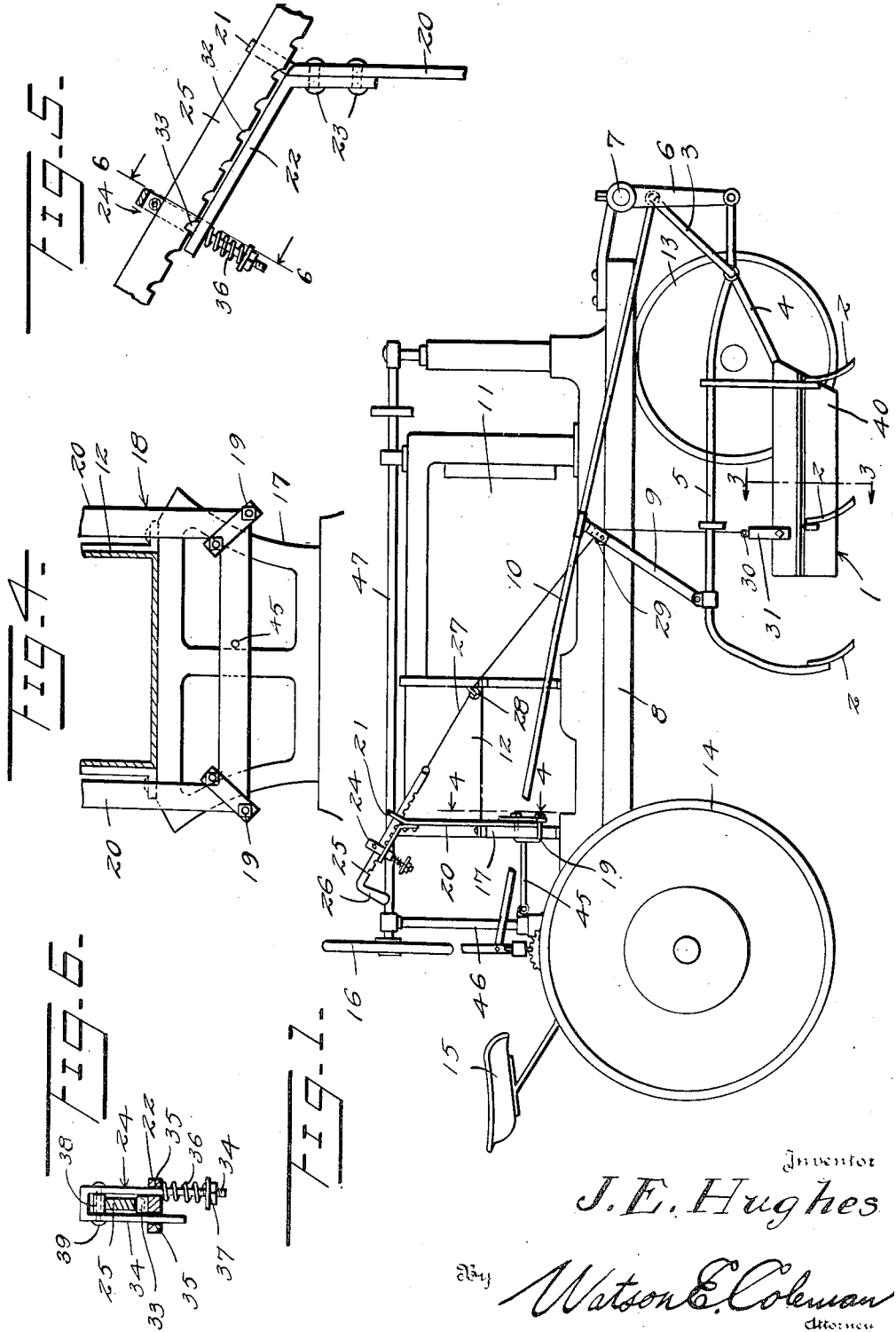

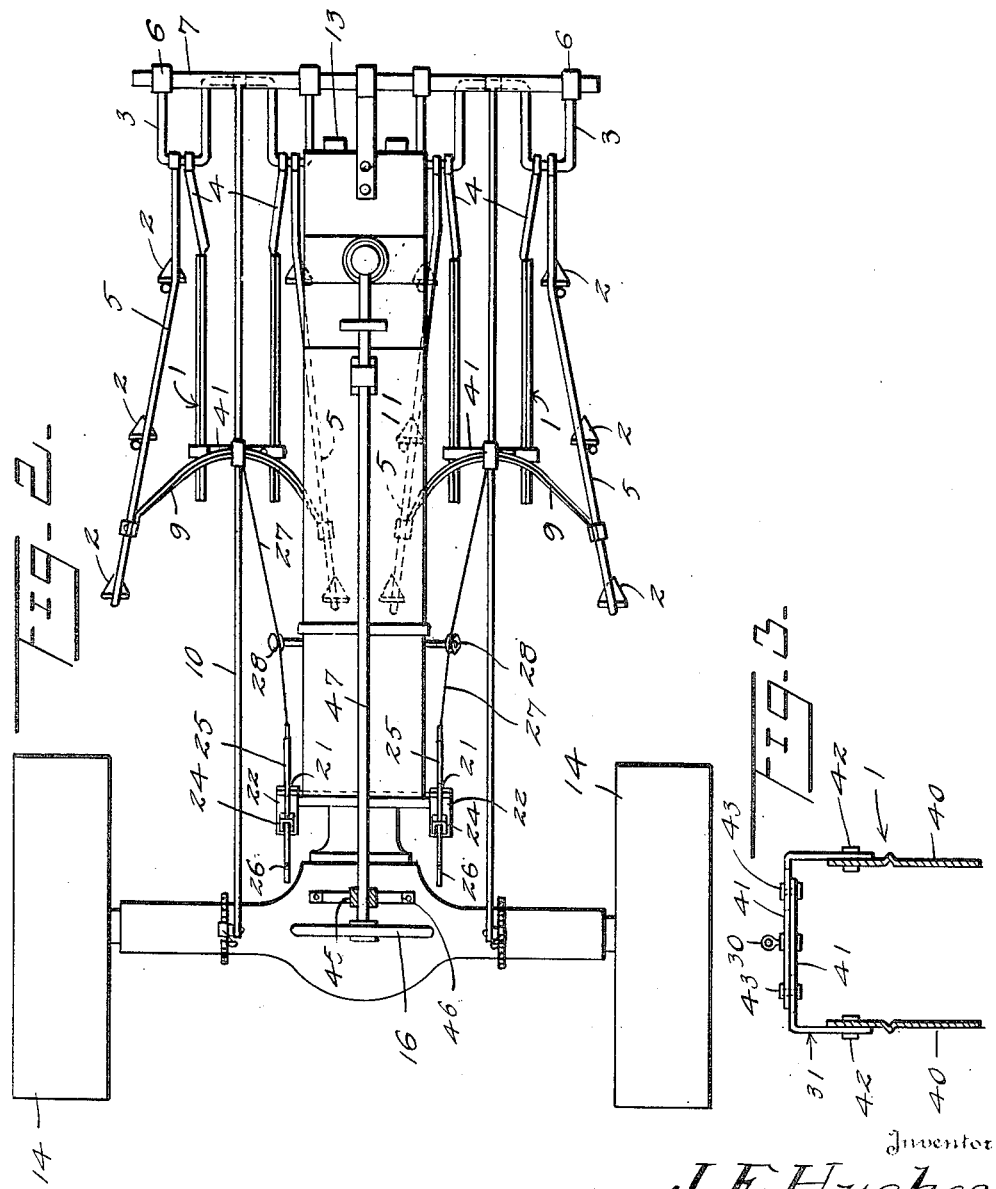

Patented Aug. 9, 1932

1,870,910

UNITED STATES PATENT OFFICE

JOSEPH E. HUGHES, OF BATTLE CREEK, NEBRASKA

MEANS FOR RAISING AND LOWERING SHIELDS OF TRACTOR SUPPORTED CULTIVATORS

Application filed July 23, 1931. Serial No. 552,712.

This invention relates to tractor supported cultivators of the multiple row type, and more particularly to novel means through the medium of which the shields of such cultivators may be raised or lowered, with relation to the ground, as the height of the plants may require.

The invention has for one of its objects to provide means of the character stated which shall be adapted to be readily applied to a tractor and to the cultivator shields, through the medium of which the shields may be independently raised or lowered, and which shall be adapted to be conveniently operated by the operator of the tractor from his seat and without stopping the tractor.

To attain the foregoing and other objects, the nature of which will appear as the description proceeds, the invention comprehends the provision of a cultivator shield raising and lowering means embodying independently operable bars slidably mounted on opposite sides of the tractor in advance of the operator's seat and within convenient reach of the seat, means connecting the respective bars to the respective cultivator shields in such manner that forward movement of the bars will lower the shields and rearward movement of the bars will raise the shields, and means holding the bars against accidental movement so as to maintain the shields in their adjusted position.

The invention is hereinafter more fully described and claimed, and illustrated in the accompanying drawings, wherein:—

Figure 1 is a view in side elevation of a tractor carried cultivator equipped with shield raising and lowering means constructed in accordance with my invention.

Figure 2 is a top plan view of the tractor cultivator and shield raising and lowering means.

Figure 3 is a sectional view on an enlarged scale taken on the vertical plane indicated by the line 3—3 of Figure 1.

Figure 4 is a sectional view on an enlarged scale taken on the vertical plane indicated by the line 4—4 of Figure 1.

Figure 5 is a view on an enlarged scale partly in side elevation and partly in vertical section of a fragmentary portion of one of the shield controlling bars and the support and latching means therefor, and Figure 6 is a sectional view taken on the plane indicated by the line 6—6 of Figure 5.

Referring in detail to the drawings, 1 designates the shields of a tractor supported cultivator of the multiple row type. The respective shields 1 are located between the respective sets of the shovels 2 of the cultivator, and are connected to the draft yokes 3 of the cultivator by drag links 4. The links 4 and the bars 5 which carry the shovels 2, are pivoted to the yokes 3, and the yokes are secured to the lower ends of arms 6 extending downwardly from the draft bar 7 secured to the front end of the frame 8 of the tractor.

The bars 5 are held apart by arches 9, and the arches are secured to bars 10 which are in turn secured to the yokes 3 and to the tractor. The shields 1 are located at opposite sides of the tractor with their longitudinal centers parallel to and spaced slightly outward from the lateral sides of the engine 11 and fuel tank 12 of the tractor which is shown as also embodying steering wheels 13, driving wheels 14 and a seat 15. The hand wheel of the steering mechanism of the tractor is designated 16. The fuel tank 12 is supported at its rear end by a bracket 17. As the cultivator and the tractor are of well-known construction, I have illustrated and described only such parts thereof as are necessary to an understanding of the application and operation of the shield raising and lowering means.

This means comprises a bracket 18 of U-form in elevation and secured, as at 19, to the front side of the fuel tank supporting bracket 17. The side members or bars 20 of the bracket 18 are located at opposite sides of the fuel tank 12 and have their upper end portions inclined upwardly and forwardly and slotted to provide guides 21. Arms 22 secured, as at 23, to the bars 20, incline upwardly and rearwardly from the lower ends of the guides 21, and are provided at their rear ends with guides 24. Bars 25 resting upon the arms 22 and passing through the guides 21 and 24, are supported by these parts in downwardly and forwardly inclined position on the tractor and for lengthwise slidable movement forwardly and rearwardly with relation to the tractor. The bars 25 are provided at their upper or rear ends with a downwardly extending handle 26 of pistol grip formation. The lower or front ends of the bars 25 are connected by wire cables 27 to the shields 1.

The cables 27 pass over guide pulleys 28 secured to the fuel tank 12 at the sides thereof, and they also pass over guide pulleys 29 secured to the arches 9. The cables 27 are secured to eye bolts 30 which are carried by yokes 31 secured to the shields 1.

The bars 25 are located above and rearwardly of the shields 1, the guide pulleys 28 are located below and forwardly of the bars, and the guide pulleys 29 are located forwardly of and below the guide pulleys 28 and directly above the shields 1. In view thereof, and as the drag links 4 are rigidly secured to the shields 1 and pivoted to the yokes 3, the rearward movement of the bars 25 will result in the raising of the shields, and the forward movement of the bars will result in the lowering of the shields.

The bars 25 are provided in their lower edges with notches 32 certain of which are adapted to engage lugs 33 carried by the arms 22 to hold the bars against accidental forward or downward movement to the end that the shields will be held in their adjusted position. The guides 21 are open at their upper ends, and the guides 24 which are closed at their upper ends are movably mounted on the arms 22 to permit the bars 25 to be raised out of engagement with the lugs 33 when it is desired to move the bars forwardly or rearwardly. The guides 24 which are of inverted U-form in elevation and embrace the bars 25, have their side members 34 extended downwardly through openings 35 in the arms 22 so as to slidably connect the guides to the arms. Coil springs 36 sleeved upon certain of the guide members 34 between the lower sides of the arms 22, and nuts 37 carried by such guide members, constantly tend to move the guides 24 in the direction of the arms 22 with the result that the bars 25 are releasably held in engagement with their arresting lugs 33.

The nuts 37 are adjustable on their bracket members 34 in order that the tension of the springs 36 may be varied, as conditions may require. Rollers 38 journaled on pins 39 carried by the guides 24 contact with the upper edges of the bars 25, the rollers permitting the free movement of the bars with respect to the guides after the bars have been raised out of engagement with their arresting lugs 33.

Each of the shields 1 comprises a pair of plates 40 arranged in spaced parallel relation. The yoke 31 of each shield 1 comprises sections 41 secured, as at 42, to the plates 40 and secured together, as at 43. The bolts 43 pass through slots 44 in the yoke sections 41, to the end that the effective width of the yoke and consequently the distance between the shield plates 40 may be increased or decreased. It will thus be seen that the width of the shields 1 may be easily varied to adapt them for plants of different thicknesses.

The adjusting bars 25 for the shields 1 are supported directly from the fuel tank supporting bracket 17. In order to reinforce the bracket 17 against distortion or displacement under the added strain thereon, the bracket is braced by a bar 45 which is secured at its rear ends to the rear support 46 of the steering shaft 47 of the tractor and which is secured at its front ends to the bracket 18.

From the foregoing description, taken in connection with the accompanying drawings, it should be apparent that by moving the adjusting bars 25 forwardly the shields 1 will be lowered into contact with the ground, that by moving the bars rearwardly the shields will be raised from the ground, and that the bars may be moved rearwardly far enough to support the shields at any desired distance above the ground. When they are released after raising the shields 1, the adjusting bars 25 will be engaged by their latches to support the shields in their raised or adjusted position with relation to the ground, the latches comprising the lugs 33, the guides 24 and the springs 36. By rocking the adjusting bars 25 upwardly through the medium of their handles 26 their latches will be operated to effect the release of the bars so that the shields 1 may be raised or lowered from their adjusted position. The adjusting bars 25 may be actuated simultaneously or independently, and in view thereof either one or both of the shields 1 may be raised or lowered. The handles 26 of the adjusting bar 25 are located close to the front side of the hand steering wheel 16, and in view thereof they are within convenient reach of the operator of the tractor who may actuate one or both of the bars without stopping the tractor. As either one or both of the shields 1 may be raised or lowered, the shields may be adjusted into such position with relation to the ground as will best adapt them to protect the plants under cultivation.

While I have described the principle of the invention, together with the structure which I now consider the preferred embodiment thereof, it is to be understood that the structure shown is merely illustrative and that such changes may be made, when desired, as fall within the scope of the invention as claimed.

What is claimed is:—

1. A cultivator shield raising and lowering device, comprising a supporting member provided with a guide and a lug, a second guide movably supported by said member, a notched bar slidably mounted on said member and passing through the guides, means for connecting the bar to a shield, a spring urging said second guide in a direction to hold the bar with one of its notches engaged with the lug, and a roller journaled in said second guide and contacting with the bar.

2. A cultivator shield raising and lowering device, comprising a bracket having upright side members provided at their upper ends with guides, arms carried by said bracket members, bars slidably mounted on the arms and passing through the guides, means for connecting the bars to shields, and means for releasably holding the bars against accidental movement.

3. A cultivator shield raising and lowering device, comprising a bracket having upright side members provided at their upper ends with guides, arms carried by said bracket members, bars slidably mounted on the arms and passing through the guides, means for connecting the bars to shields, and means carried by the arms for releasably holding the bars against accidental movement.

4. A cultivator shield raising and lowering device, comprising a bracket having upright side members provided at their upper ends with guides, arms carried by said bracket members, bars slidably mounted on the arms and passing through the guides, means for connecting the bars to shields, lugs carried by the arms, second guides embracing the bars and movably mounted on the arms, rollers carried by said second guides and contacting with the bars, the bars being provided with notches certain of which engage the lugs, and springs carried by said second guides and bearing against the arms to constantly tend to move said second guides in a direction to hold the bars in engagement with the lugs.

5. A cultivator shield raising and lowering device, comprising a supporting member provided with an upstanding guide and a lug, the guide having a fixed position on said member and open at its upper end, a second upstanding guide mounted on said member for upward and downward movement thereon and closed at its upper end, a notched bar slidably mounted on said member and passing through the guides, means for connecting the bar to a shield, and a spring urging said second guide in the direction of said member to hold the bar with one of its notches engaged with the lug.

In testimony whereof I hereunto affix my signature.

JOSEPH E. HUGHES.